(12) United States Patent
Yin et al.

(10) Patent No.: US 12,101,544 B2
(45) Date of Patent: Sep. 24, 2024

(54) DIGITAL IMAGE SENSING DEVICE WITH LIGHT INTENSIFIER

(71) Applicant: Zhejiang Normal University, Jinhua (CN)

(72) Inventors: Shuohan Yin, Jinhua (CN); Chenchen Liao, Jinhua (CN); Juntian Shi, Jinhua (CN); Facheng Sun, Jinhua (CN); Kan Li, Jinhua (CN); Jianfeng Sun, Jinhua (CN); Hongfei Wang, Jinhua (CN); Zhengyuan Yang, Jinhua (CN); Xiaoyuan Guan, Jinhua (CN); Yaojie Wang, Jinhua (CN)

(73) Assignee: Zhejiang Normal University

( * ) Notice: Subject to any disclaimer, the term of this patent is extended or adjusted under 35 U.S.C. 154(b) by 175 days.

(21) Appl. No.: 18/076,445

(22) Filed: Dec. 7, 2022

(65) Prior Publication Data

US 2023/0101115 A1    Mar. 30, 2023

(30) Foreign Application Priority Data

Jun. 9, 2022   (CN) .......................... 202210643683.7

(51) Int. Cl.
*H04N 23/55* (2023.01)
*H04N 23/54* (2023.01)
*H04N 23/68* (2023.01)

(52) U.S. Cl.
CPC ............. *H04N 23/55* (2023.01); *H04N 23/54* (2023.01); *H04N 23/685* (2023.01)

(58) Field of Classification Search
CPC ........ H04N 23/51; H04N 23/55; H04N 23/54; H04N 23/56; H04N 23/685

USPC ........................................................... 348/335
See application file for complete search history.

(56) References Cited

U.S. PATENT DOCUMENTS

| 6,172,708 B1* | 1/2001 | Palmer | G02B 23/12 348/217.1 |
|---|---|---|---|
| 7,092,013 B2* | 8/2006 | Bacarella | H04N 5/265 348/E5.025 |
| 7,129,462 B2* | 10/2006 | Hogan | H04N 23/20 348/E5.04 |
| 7,696,462 B2* | 4/2010 | Saldana | G02B 23/12 250/214 VT |
| 7,928,397 B2* | 4/2011 | Barrett | A61B 6/508 600/407 |
| 8,164,667 B2* | 4/2012 | Ho | H04N 25/616 348/308 |

(Continued)

*Primary Examiner* — Pritham D Prabhakher
(74) *Attorney, Agent, or Firm* — Jose Cherson Weissbrot

(57) ABSTRACT

The present disclosure provides a digital image sensing device with a light intensifier, its structure includes a locating handle, a button, a host, a light intensifier, a regulating mechanism and a sensor, wherein the locating handle is connected to the host, the host fits with the light intensifier through the button in a form of electric connection, and the regulating mechanism is arranged between the light intensifier and the sensor; a stopping device and an interweaving device are arranged on a force-assisted body, and mutual fit is performed on a fillet cylinder through the stopping device and the interweaving device; when a guide rail has a closing tendency, a drum bulge inside the guide rail will firstly push the fillet cylinder to roll upwards, the interweaving device is guided to be located on a stabilizer through a pulling sheet.

8 Claims, 7 Drawing Sheets

(56) References Cited

U.S. PATENT DOCUMENTS

| | | | |
|---|---|---|---|
| 8,902,523 B2* | 12/2014 | Jamison | H01J 31/50 |
| | | | 359/893 |
| 10,692,902 B2* | 6/2020 | Lee | H04N 23/45 |
| 10,734,183 B2* | 8/2020 | Balboni | H01J 29/98 |
| 11,910,125 B2* | 2/2024 | Joo | G02B 3/14 |
| 2003/0230707 A1* | 12/2003 | Hogan | H01J 31/50 |
| | | | 348/E5.04 |
| 2003/0231245 A1* | 12/2003 | Bacarella | H04N 23/75 |
| | | | 348/E5.025 |
| 2009/0050811 A1* | 2/2009 | Barrett | A61B 6/508 |
| | | | 250/363.04 |
| 2010/0283877 A1 | 11/2010 | Ho et al. | |
| 2012/0069431 A1* | 3/2012 | Hagen | G02B 7/06 |
| | | | 359/399 |
| 2012/0070119 A1* | 3/2012 | Hagen | G02B 23/12 |
| | | | 385/53 |
| 2012/0162489 A1* | 6/2012 | Ho | H04N 25/745 |
| | | | 348/294 |
| 2015/0350629 A1* | 12/2015 | Keesling | H04N 23/683 |
| | | | 348/53 |
| 2016/0165104 A1* | 6/2016 | Gobeli | H04N 23/54 |
| | | | 348/217.1 |
| 2019/0006400 A1 | 1/2019 | Lee | |
| 2021/0335566 A1* | 10/2021 | Smith | H01J 31/507 |
| 2022/0030153 A1* | 1/2022 | Joo | G02B 27/4205 |

\* cited by examiner

DIGITAL IMAGE SENSING DEVICE WITH LIGHT INTENSIFIER

TECHNICAL FIELD

The present disclosure relates to the technical field of image sensing, in particular to a digital image sensing device with a light intensifier.

BACKGROUND

With the maturity of technology, an image quality of an existing digital camera is getting close to the standard of a traditional camera. At present, the digital camera with millions of pixels has become the mainstream on the market, and the digital camera will replace the market of the traditional camera. A light intensifier may be used to fill light when necessary, thereby improving an image capture effect. The existing digital image sensing device with the light intensifier is usually provided with an inverted-V opening and closing clip, which cooperates with a guide rail to regulate a distance with the light intensifier, and has a certain light-gathering ability, to ensure that its light-emitting scope is the same as the image capture scope of the sensor, thereby increasing the brightness of the image. Since the inclined opening of the guide rail is supported by a drum bulge, when the opening and closing clip slides and clamps an edge of the guide rail, a maximum clamping force will be applied to the guide rail, so that the guide rail has a closing tendency, and the drum bulge inside the guide rail is extruded, resulting in a flat drum bulge and overflowing to an inner wall of the opening and closing clip; and the opening and closing clip is guided secondly to slide upwards, and exceed the light-emitting scope of the light intensifier, so as to reduce the image capture effect after the device is filled with light.

SUMMARY

Aim at the above problem, the present disclosure provides a digital image sensing device with a light intensifier, its structure includes a locating handle, a button, a host, a light intensifier, a regulating mechanism and a sensor, wherein the locating handle is connected to the host, the host fits with the light intensifier through the button in a form of electric connection, the regulating mechanism is arranged between the light intensifier and the sensor, the regulating mechanism includes an opening and closing clip, a drum bulge, a stabilizer, a force-assisted body, a release base and a guide rail, the opening and closing clip is connected below the sensor and in sliding fit with the guide rail, the guide rail is connected to the release base through the drum bulge and provided with the force-assisted body, and the release base is connected to the light intensifier through the stabilizer.

As a further improvement of the present disclosure, the force-assisted body includes a pulling sheet, a stopping structure, a fillet cylinder, a shock insulator and an interweaving device; the pulling sheet is connected to the fillet cylinder and in clearance fit with the stabilizer through the stopping structure; and the fillet cylinder is installed with the interweaving device through the shock insulator and in transition fit with the drum bulge.

As a further improvement of the present disclosure, the fillet cylinder and the shock insulator are clamped between the stabilizer and the opening and closing clip through the pulling sheet, so as to regulate itself rolling angle completely, and with an initial backstop function.

As a further improvement of the present disclosure, the stopping structure includes a snap ring, a clamping jaw, a cross frame, a filling plate and an undertaking member; and the snap ring is connected to the shock insulator and connected to the clamping jaw, and the cross frame and the filling plate are movably clamped in the clamping jaw through the undertaking member.

As a further improvement of the present disclosure, the clamping jaw is in clearance fit with the shock insulator and the fillet cylinder through the cross frame, so as to effectively control the rolling direction of the fillet cylinder.

As a further improvement of the present disclosure, the undertaking member includes a fillet handrail, a connecting rod, an auxiliary belt, push-together buckles and a bent handle; the fillet handrail is connected to the auxiliary belt through the auxiliary belt and connected to the push-together buckles, the bent handle is connected between the push-together buckles, the belt handle is in clearance fit below the filling plate, the auxiliary belt is connected to the connecting rod through the cross frame, and the connecting rod is in sliding fit with the clamping jaw.

As a further improvement of the present disclosure, the interweaving device includes a stopper, a stacked tape, an isolation mat and a folded plate; and the stopper is connected to the fillet cylinder and movably clamped with the folded plate through the stacked tape; and the folded plate is in clearance fit with the stabilizer and the pulling sheet through the isolation mat.

As a further improvement of the present disclosure, the isolation mat includes a flat dragging base, a guard plate, a guide pin, a resisting pin and a passage pole; the flat dragging base is connected between the stopper and the passage pole and connected to the guide pin; and the guide pin is in sliding fit with the passage pole, the passage pole is in rotary fit between the guard plate and the folded plate through the resisting pin, and the guard plate is in clearance fit with the stabilizer.

Beneficial Effects:

Compared with the prior art, the present disclosure has the following beneficial effects:

1. In the present disclosure, the stopping device and the interweaving device are arranged on the force-assisted body, and mutual fit is performed on the fillet cylinder by using the stopping device and the interweaving device; when the guide rail has a closing tendency, the drum bulge inside the guide rail will firstly push the fillet cylinder to roll upwards, the interweaving device is guided to be located on the stabilizer through the pulling sheet, and then the interweaving device is intensively clamped on the stopping structure through the isolation mat in a four-side supporting manner, so that the interweaving device extrudes and rebates on the rolling fillet cylinder, a stop force is formed for the drum bulge, thereby maintaining the stability of the opening and closing clip on the guide rail and ensuring the image capture effect after the device is filled with light.

2. The present disclosure may have deformation and bending of different degrees in a manner that the bent handle is pushed through the push-together buckles and in cooperation with the cross stress of the filling plate and the cross frame, so that the bent handle is convenient to press powerfully at the two sides of the drum bulge, thereby effectively controlling the transverse extension of the drum bulge.

3. In the present disclosure, the guide pin is a bending structure, wherein a protrusion part of the folded plate is adhered to at a bending part, so as to change itself extension degree, further control the rotation direction of the passage pole and strengthen the support of the passage pole to the stopper.

Figure 1:
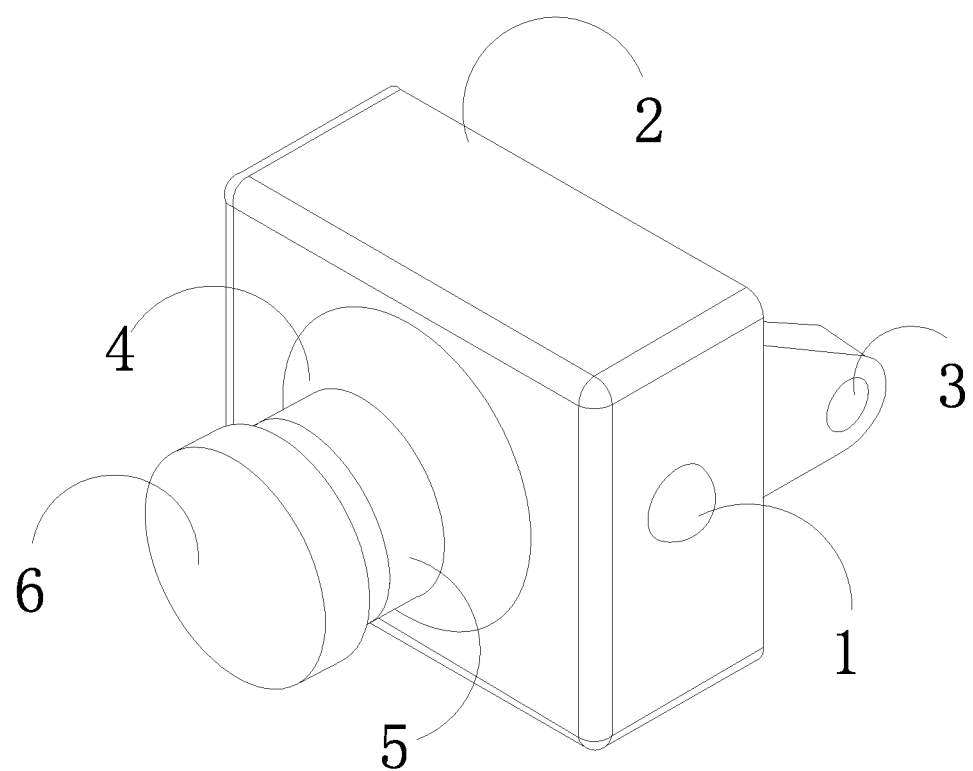
FIG. 1 is a structural schematic diagram of a digital image sensing device with a light intensifier device in the present disclosure.

In the drawings: locating handle-3, button-1, host-2, light intensifier-4, regulating mechanism-5, sensor-6, opening and closing clip-q5, drum bulge-w2, stabilizer-e1, force-assisted body-r3, release base-t4, guide rail-g6, pulling sheet-y34, stopping structure-u33, fillet cylinder-i32, shock insulator-o31, interweaving device-p35, snap ring-3a3, clamping jaw-3s2, cross frame-3d1, filling plate-3f4, undertaking member-3h5, fillet handrail j51, connecting rod-k54, auxiliary belt-152, push-together buckle-z53, bent handle-x55, stopper-5c3, stacked tape-5v2, isolation mat-5b1, folded plate-5n4, flat dragging base-w14, guard plate-e13, guide pin-r12, resisting pin-t11, passage pole-y15.

DETAILED DESCRIPTION OF THE EMBODIMENTS

Based on the embodiments of the present disclosure, all the other embodiments obtained by those of ordinary skill in the art on the premise of not contributing creative effort should belong to the protection scope of the present disclosure.

Embodiment 1

Figure 2:
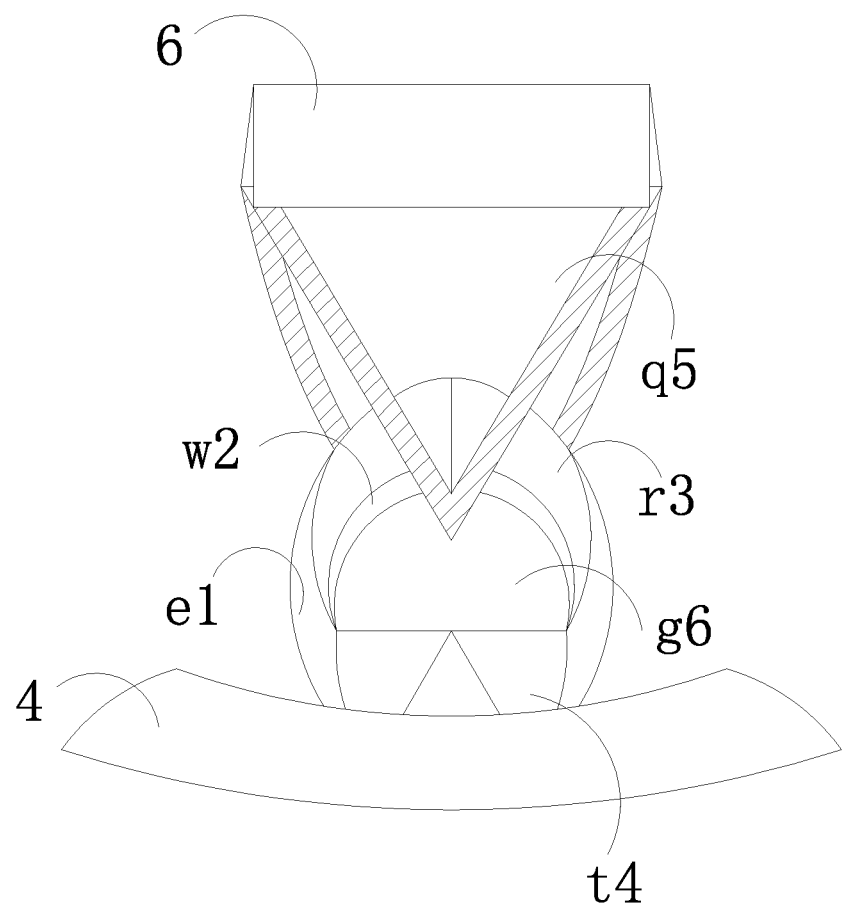
FIG. 2 is a structural schematic diagram of a regulating mechanism in the present disclosure.
Figure 3:
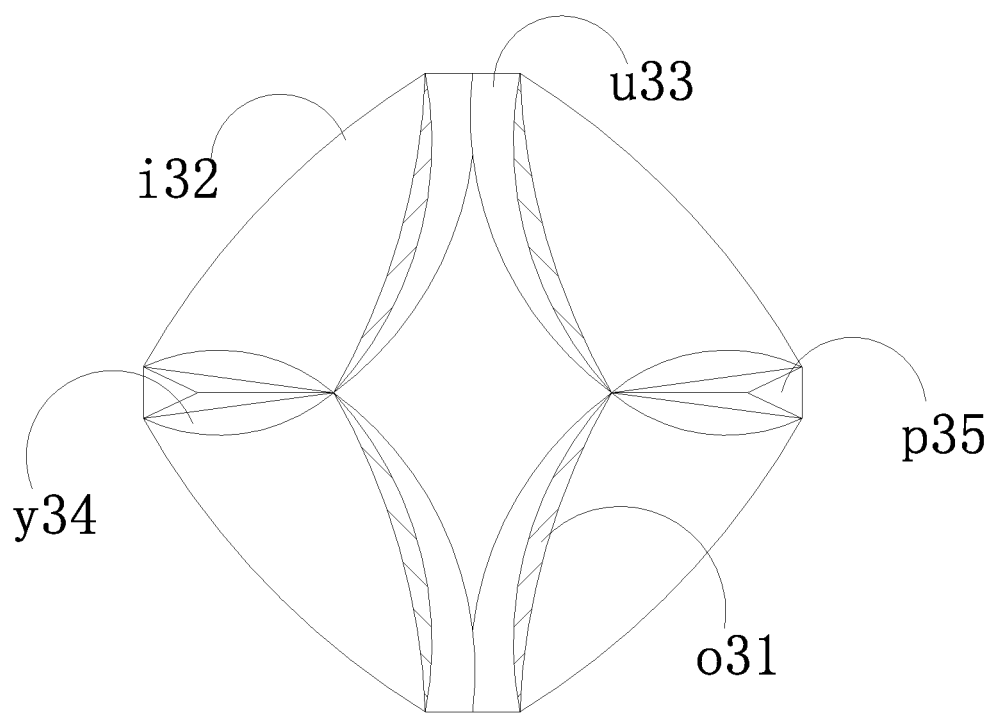
FIG. 3 is a structural schematic diagram of a force-assisted body in the present disclosure.
Figure 4:
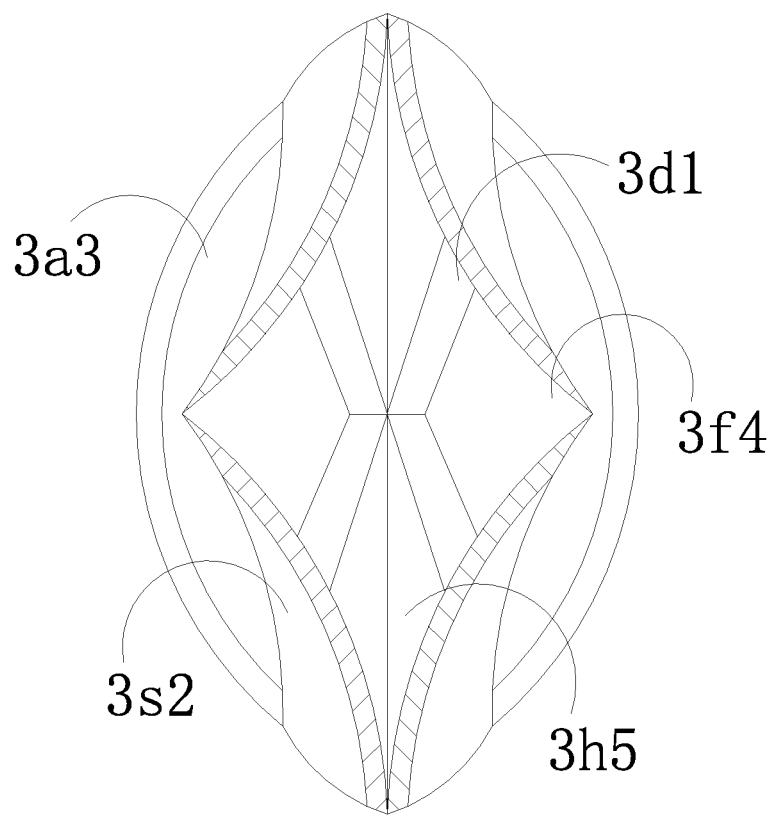
FIG. 4 is a structural schematic diagram of a stopping structure in the present disclosure.
Figure 5:
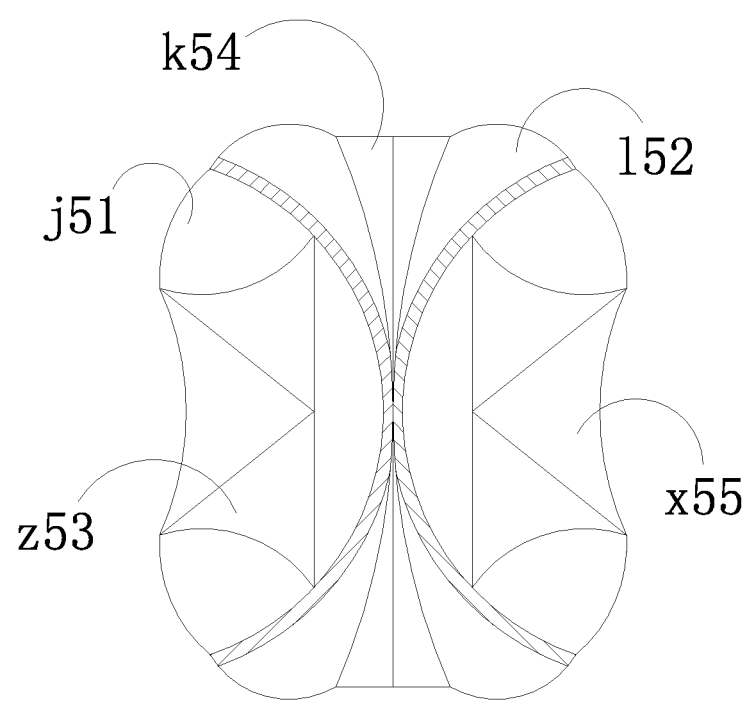
FIG. 5 is a structural schematic diagram of an undertaking member in the present disclosure.
Figure 6:
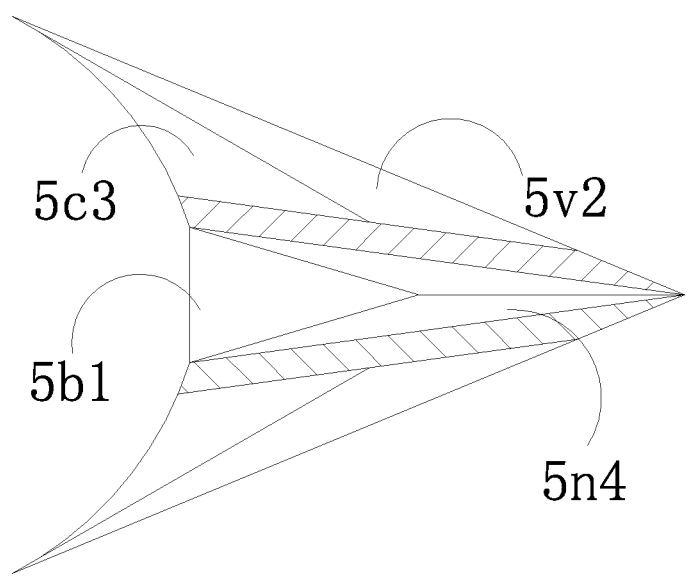
FIG. 6 is a structural schematic diagram of an interweaving device in the present disclosure.
Figure 7:
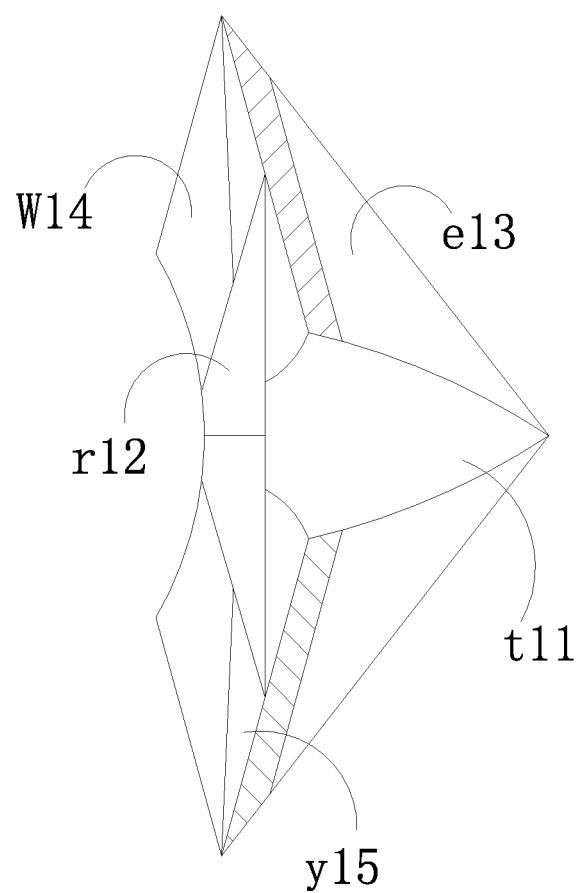
FIG. 7 is a structural schematic diagram of an isolation mat in the present disclosure.

As shown in FIG. 1 to FIG. 3, the present disclosure provides a digital image sensing device with a light intensifier, its structure includes a locating handle 3, a button 1, a host 2, a light intensifier 4, a regulating mechanism 5 and a sensor 6, wherein the locating handle 3 is welded on the host 2, the host 2 fits with the light intensifier 4 through the button 1 in a form of electric connection, and the regulating mechanism 5 is arranged between the light intensifier 4 and the sensor 6; the regulating mechanism 5 includes an opening and closing clip q5, a drum bulge w2, a stabilizer e1, a force-assisted body r3, a release base t4 and a guide rail g6, the opening and closing clip q5 is fixedly connected below the sensor 6 and in sliding fit with the guide rail g6, the guide rail g6 is in hinge connection with the release base t4 through the drum bulge w2 and provided with the force-assisted body r3, and the release base t4 is in embedding connection with the light intensifier 4 through the stabilizer e1. The force-assisted body r3 includes a pulling sheet y34, a stopping structure u33, a fillet cylinder i32, a shock insulator o31 and an interweaving device p35; the pulling sheet y34 is in hinge connection with the fillet cylinder i32 and in clearance fit with the stabilizer e1 through the stopping structure u33; and the fillet cylinder i32 is installed with the interweaving device p35 through the shock insulator o31 and in transition fit with the drum bulge w2. Four fillet cylinders i32 are provided and movably clamped between the stabilizer e1 and the opening and closing clip q5 through the pulling sheet y34 and the shock insulator o31, so as to completely regulate the itself rolling angle and have the initial backstop function. The stopping device u33 and the interweaving device p35 are arranged on the force-assisted body r3, mutual fit is performed on the fillet cylinder i32 by using the stopping device u33 and the interweaving device p35; when the guide rail g6 has a closing tendency, the drum bulge w2 inside the guide rail g6 will firstly push the fillet cylinder i32 to roll upwards, the interweaving device p35 is guided to be located on the stabilizer e1 through the pulling sheet y34, and then the interweaving device p35 is intensively clamped on the stopping structure u33 through the shock insulator o31 in a four-side supporting manner, so that the stopping structure u33 extrudes and rebates on the rolling fillet cylinder i32, a stop force is formed for the drum bulge w2, thereby maintaining the stability of the opening and closing clip q5 on the guide rail g6 and ensuring the image capture effect after the device is filled with light.

Embodiment 2

As shown in FIG. 4 to FIG. 7, based on the embodiment 1 and in combination with the mutual fit with the following structure components in the present disclosure, the stopping structure u33 includes a snap ring 3a3, a clamping jaw 3s2, a cross frame 3d1, a filling plate 3f4 and an undertaking member 3h5; and the snap ring 3a3 is in welding connection with a shock insulator o31 and in hinged connection with the clamping jaw 3s2, the cross frame 3d1 and the filling plate 3f4 are movably clamped in the clamping jaw 3s2 through the undertaking member 3h5, and the clamping jaw 3s2 is in clearance fit with the shock insulator o31 and the fillet cylinder i32 through the cross frame 3d1, so as to effectively control the rolling direction of the fillet cylinder i32. The undertaking member 3h5 includes a fillet handrail j51, a connecting rod k54, an auxiliary belt 152, push-together buckles z53 and a bent handle x55; the fillet handrail j51 is in hinge connection with the auxiliary belt 152 through the auxiliary belt 152 and fixedly connected to the push-together buckles z53, the bent handle x55 is welded between the push-together buckles z53, the belt handle x55 is in clearance fit below the filling plate 3f4, the auxiliary belt 152 is in sleeve connection with the connecting rod k54 through the cross frame 3d1, and the connecting rod k54 is in sliding fit with the clamping jaw 3s2. The interweaving device p35 includes a stopper 5c3, a stacked tape 5v2, an isolation mat 5b1 and a folded plate 5n4; and the stopper 5c3 is a triangular structure, in welding connection with the fillet cylinder i32 and movably clamped with the folded plate 5n4 through the stacked tape 5v2; and the folded plate 5n4 is in clearance fit with the stabilizer e1 and the pulling sheet y34 through the isolation mat 5b1. The isolation mat 5b1 includes a flat dragging base w14, a guard plate e13, a guide pin r12, a resisting pin t11 and a passage pole y15; the flat dragging base w14 is in welding connection between the stopper 5c3 and the passage pole y15 and in hinge connection with the guide pin r12; and the guide pin r12 is in sliding fit with the passage pole y15, the passage pole y15 is in rotary fit between the guard plate e13 and the folded plate 5n4 through the resisting pin t11, and the guard plate e13 is in clearance fit with the stabilizer e1. The deformation and bending of different degrees may generate in a manner that the bent handle x55 is pushed through the push-together buckle z53 and in cooperation with the cross stress of the filling plate 3f4 and the cross frame 3d1, so that the bent handle x55 is convenient to press powerfully at the two sides of the drum bulge w2, thereby effectively controlling the transverse extension of the drum bulge w2. The guide pin r12 is a bending structure, wherein a protrusion part of the folded plate 5n4 is adhered to a bending part, so as to change itself extension degree, further control the rotation direction of the passage pole y15 and strengthen the support of the passage pole y15 to the stopper 5c3.

The working principle of the digital image sensing device with the light intensifier in the technical solution is described in details below:

During use, when the opening and closing clip q5 is slidingly clamped to the edge of the guide rail g6, the force-assisted body r3 is arranged on the stabilizer e1 in order to prevent the closing tendency of the guide rail g6 and prevent the overflow of the drum bulge w2 inside the guide rail g6. When the guide rail g6 is further tightened outside the drum bulge w2, the guide rail g6 will firstly contact with the outer side of the fillet cylinder i32, so that the fillet cylinder i32 pulls the shock insulator o31 to roll inside the opening and closing clip q5 and drives the pulling sheet y34 to close to the stabilizer e1 synchronously, and then the pulling sheet y34 is opened, and the guide rail g6 is pressed at the two sides of the folded plate 5n4 by the stopper 5c3 along the stacked tape 5v2, and the folded plate 5n4 pushes the bent part of the guide pin r12 to arch due to the promotion of the drum bulge w2. Taking the flat dragging base w14 as a support point, a tip is closed and slides on the passage pole y15, so that the passage pole y15 turns out at the two sides of the resisting pin t11, and the resisting pin t11 is driven to push the guard plate e13 to be resisted on the stabilizer e1 together, thereby gradually hanging with the tip of the stabilizer e1 and being folded together. The rolling angle of the fillet cylinder i32 inside the guide rail g6 is initially limited, while the fillet cylinder i32 rolls, the other side will pull the shock insulator o31 to be stretched together, so that the shock insulator o31 will be straightened and relax on the snap ring 3a3. The snap ring 3a3 is horizontally driven to stretch, so as to change the rolling angle and the opening degree of the clamping jaw 3s2 above the snap ring 3a3, control the clamping jaw 3s2 to be opened upwards, isolate the limitation of the shock insulator o31 and pull the cross frame 3d1 to deform together. Taking the clamping jaw 3s2 as a support point, the filling plate 3f4 is clamped and reversely arched to the bent handle x55, so that the bent handle x55 is stressed and adhered to the drum bulge w2. When being stabilized, the bent handle x55 may also reversely support the clamping jaw 3s2 to be opened and stretch and climb above the fillet cylinder i32, and then the further rolling and stability of the fillet cylinder i32 are limited. At the same time, in cooperation with the deformation of the cross frame 3d1, the auxiliary belt 152 may be driven to synchronously grab and pull the deflection of the fillet handle j51 on the connecting rod k54, so that the fillet handle j51 internally rotates and pushes the push-together buckle z553 and extrudes the two sides of the bent handle x55, and then the fillet handle j51 is in crossed pressing on the drum bulge w2 in a *-shaped. The deformation direction and itself elasticity of the drum bulge w2 may be completely regulated and controlled, the stability of the opening and closing clip q5 on the guide rail g6 is maintained, the light-gathering ability of the opening and closing clip q5 on the light intensifier 4 is ensured, and the image capture effect of the sensor 6 is strengthened.

In the description of the present disclosure, it is understood that orientation or position relationships indicated by the terms "center", "lateral", "length", "width", "height", "upper", "lower", "front", "rear", "left", "right", "vertical", "horizontal", "top", "bottom", "inner", "outer", "side" and the like are based on the orientation or position relationships as shown in the drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

Each technical feature of the above embodiments may be combined freely. For simplicity of description, not all possible combinations of each technical solution in the above embodiments are described. However, any combination of these technical features shall fall within the scope recorded in the specification without conflicting.

What is claimed is:

1. A digital image sensing device with a light intensifier, wherein its structure comprises a locating handle (3), a button (1), a host (2), a light intensifier (4), a regulating mechanism (5) and a sensor (6), wherein the locating handle (3) is connected to the host (2), the host (2) fits with the light intensifier (4) through the button (1) in a form of electric connection, the regulating mechanism (5) is arranged between the light intensifier (4) and the sensor (6), the regulating mechanism (5) comprises an opening and closing clip (q5), a drum bulge (w2), a stabilizer (e1), a force-assisted body (r3), a release base (t4) and a guide rail (g6), the opening and closing clip (q5) is connected below the sensor (6) and in sliding fit with the guide rail (g6), the guide rail (g6) is connected to the release base (t4) through the drum bulge (w2) and provided with the force-assisted body (r3), and the release base (t4) is connected to the light intensifier (4) through the stabilizer (e1).

2. The digital image sensing device with the light intensifier according to claim 1, wherein the force-assisted body (r3) comprises a pulling sheet (y34), a stopping structure (u33), a fillet cylinder (i32), a shock insulator (o31) and an interweaving device (p35); the pulling sheet (y34) is connected to the fillet cylinder (i32) and in clearance fit with the stabilizer (e1) through the stopping structure (u33); and the fillet cylinder (i32) is installed with the interweaving device (p35) through the shock insulator (o31) and in transition fit with the drum bulge (w2).

3. The digital image sensing device with the light intensifier according to claim 2, wherein the fillet cylinder (i32) and the shock insulator (o31) are movably clamped between the stabilizer (e1) and the opening and closing clip (q5) through the pulling sheet (y34).

4. The digital image sensing device with the light intensifier according to claim 2, wherein the stopping structure (u33) comprises a snap ring (3a3), a clamping jaw (3s2), a cross frame (3d1), a filling plate (3f4) and an undertaking member (3h5); and the snap ring (3a3) is connected to the shock insulator (o31) and connected to the clamping jaw (3s2), and the cross frame (3d1) and the filling plate (3f4) are movably clamped in the clamping jaw (3s2) through the undertaking member (3h5).

5. The digital image sensing device with the light intensifier according to claim 4, wherein the clamping jaw (3s2) is in clearance fit with the shock insulator (o31) and the fillet cylinder (i32) through the cross frame (3d1).

6. The digital image sensing device with the light intensifier according to claim 4, wherein the undertaking member (3*h*5) comprises a fillet handrail (j51), a connecting rod (k54), an auxiliary belt (152), push-together buckles (z53) and a bent handle (x55); the fillet handrail (j51) is connected to the auxiliary belt (152) through the auxiliary belt (152) and connected to the push-together buckles (z53), the bent handle (x55) is connected between the push-together buckles (z53), the belt handle (x55) is in clearance fit below the filling plate (3*f*4), the auxiliary belt (152) is connected to the connecting rod (k54) through the cross frame (3*d*1), and the connecting rod (k54) is in sliding fit with the clamping jaw (3*s*2).

7. The digital image sensing device with the light intensifier according to claim 2, wherein the interweaving device (p35) comprises a stopper (5c3), a stacked tape (5v2), an isolation mat (5b1) and a folded plate (5n4); and the stopper (5c3) is connected to the fillet cylinder (i32) and movably clamped with the folded plate (5n4) through the stacked tape (5v2); and the folded plate (5n4) is in clearance fit with the stabilizer (e1) and the pulling sheet (y34) through the isolation mat (5b1).

8. The digital image sensing device with the light intensifier according to claim 7, wherein the isolation mat (5b1) comprises a flat dragging base (w14), a guard plate (e13), a guide pin (r12), a resisting pin (t11) and a passage pole (y15); the flat dragging base (w14) is connected between the stopper (5c3) and the passage pole (y15) and connected to the guide pin (r12); and the guide pin (r12) is in sliding fit with the passage pole (y15), the passage pole (y15) is in rotary fit between the guard plate (e13) and the folded plate (5n4) through the resisting pin (t11), and the guard plate (e13) is in clearance fit with the stabilizer (e1).

\* \* \* \* \*